Patented Aug. 14, 1951

2,564,365

UNITED STATES PATENT OFFICE 2,564,365

METHOD FOR PRODUCING ORTHOTITANIC ACID

Franklin L. Kingsbury, Westfield, N. J., assignor to National Lead Company, New York, N. Y., a corporation of New Jersey No Drawing. Application December 21, 1949, Serial No. 134,345

2 Claims. (Cl. 23—140)

This invention relates to a method for producing titanium hydrate. More specifically it relates to a method for producing titanium hydrate from an iron-containing titanium solution. Still more specifically it relates to a method for producing orthotitanic acid from an ilmenite solution.

Titanium hydrate may be hydrolyzed from a solution by many known processes. It may be hydrolyzed in either of two modifications, the so-called metatitanic acid and the so-called orthotitanic acid; the former being difficultly soluble in dilute mineral acid, and the latter being readily soluble in dilute mineral acid. The present invention is concerned with the production of the so-called orthotitanic acid form of titanium hydrate.

Orthotitanic acid is most commonly produced by reacting a titanium salt solution with an alkali solution. Most of the known processes carry out the reaction at room temperature. The titanium salt solution usually employed is an iron-containing titanium sulfate solution obtained from the reaction of ilmenite ore with sulfuric acid. The alkali solution most commonly used is an alkali metal carbonate or hydroxide solution, particularly those of sodium, because of the economical consideration involved.

Some of the known processes for producing orthotitanic acid from an iron-containing titanium solution teach the addition of the alkali solution to the titanium solution but most prefer to add the titanium salt solution to the alkali solution. In the former process difficulties are encountered in filtering and washing of the hydrates produced. The hydrates are sometimes of such a nature that the rates of filtration and washing are very slow and very difficult to handle. In the latter process the hydrates produced are contaminated with detrimental amounts of impurities such as, for example iron, which cannot normally be removed during the subsequent processing of the so-produced hydrate and are sometimes fairly difficult to filter.

An object of the present invention therefore is to present a simple and economical method for producing orthotitanic acid. Another object is to present a method for producing relatively pure orthotitanic acid from an iron-containing titanium solution. A further object is to produce orthotitanic acid which is easily handled. These and other objects will become apparent from the following more complete description of the present invention.

Broadly this invention contemplates a method for producing a substantially iron free, rapid filtering orthotitanic acid which comprises admixing titanium iron sulfate solution and an alkali solution to form a mixture thereof, said solutions being added one to the other, i. e. simultaneously adding the solutions one to another, at rates sufficient to maintain said mixing during such addition at a pH range from 3.5 to 4.5.

By the process of this invention the titanium hydrate is precipitated as an orthotitanic acid at a substantially constant pH value during such additions which apparently has a substantial beneficial effect upon the characteristics of the hydrate produced. A rapid filtering and a substantially pure hydrate is obtained by this process. In contrast to this substantially constant pH precipitation method, the prior art processes precipitate the orthotitanic acid in an ever changing pH and consequently different characteristics are produced by such processes.

By the process of this invention it is preferred to precipitate a titanium hydrate from a titanium iron solution obtained from the sulfuric acid reaction with ilmenite ore. It is also preferred to use a solution of sodium carbonate or sodium hydroxide to precipitate the titanium values from the iron-containing titanium solution. As stated previously the two solutions are admixed to form a mixture thereof, said solutions being added one to the other at rates sufficient to maintain said mixture during such addition at a pH range from 3.5 to 4.5. When the solutions are added completely one to the other it is desirable to stir the reaction products for ½ hour to 1½ hours to obtain complete reaction.

In order to illustrate a preferred embodiment of the present invention, the following example is presented.

EXAMPLE I

An iron-containing titanium solution, which was prepared from the reaction of ilmenite ore with sulfuric acid, had the following analysis:

| | Grams per liter |
|---|---|
| $TiO_2$ | 100 |
| $H_2SO_4$ | 192 |
| $FeSO_4$ | 58 |
| $Ti^{3+}$, calculated as $TiO_2$ | 1 |

This titanium solution and an alkali solution containing 100 grams per liter sodium carbonate were admixed at room temperature in a tank to form a mixture thereof, the solutions were added one to the other at rates sufficient to maintain said mixture during such additions at a pH range of 3.5 to 4.5. The pH was continually recorded by means of electrodes immersed in the mixture during such additions. The pH of the mixture varied during this run from 3.8 to 4.3 with a final pH of 4.1. 1000 parts of titanium solution were added and precipitated over a 60 minute period by the sodium carbonate solution. The resultant mixture which consists of 3300 parts was stirred for 45 minutes after the additions of the solutions had been terminated. The entire procedure was carried out at room temperature. The precipitated orthotitanic acid was then filtered and washed with water to remove the adhered soluble salts. The results of this run showed that the titanium hydrate produced was substantially iron free and that a fast filtration rate was obtained. The results are recorded in Table I.

In order to compare the process of the present invention two additional runs were made by the known prior art processes which have been previously described. The first control run was made by adding the iron containing titanium solution to the alkali solution. A solution similar to that described in Example I was employed for this run. In order to avoid the excess $CO_2$ which would form during the neutralization step, the solution was previously neutralized with sodium carbonate and had the following analyses:

|  | Grams per liter |
|---|---|
| $TiO_2$ | 43.5 |
| $H_2SO_4$ | 39.5 |
| $FeSO_4$ | 25.2 |
| $Ti^{3+}$, calculated as $TiO_2$ | 0.4 |

2300 parts of the adjusted titanium solution were added to 1000 parts of sodium carbonate solution of a concentration of 70 grams per liter sodium carbonate. 70 minutes were required to add the titanium solution to the alkali. The resultant mixture was stirred for 30 minutes after the completion of the addition. Again the entire procedure was carried out at room temperature. The pH of the mixture decreased during this run from pH=10+ to a final value of pH=4.0. The cipitated orthotitanic acid was then filtered and washed with water to remove the adhered soluble salts. The resultant hydrate was considerably slower filtering and had a considerable iron contamination. The results of this control run are presented in Table I.

The second control run was carried out with the same type of solution as shown in Example I, except that a sodium carbonate solution was added to the iron containing titanium solution. The amounts of each solution and the time of addition were similar to Control I. The resultant precipitate of orthotitanic acid was extremely slow filtering, and the iron contamination was extremely bad. The results are recorded in Table I.

Table I

|  | Method of Addition of Solutions | Time of Filtration | Iron Contamination in Orthohydrate, $Fe_2O_3$ on $TiO_2$ Basis |
|---|---|---|---|
|  |  | Minutes | Per cent |
| Example I | admixing titanium solution and alkali solution one to the other. | 4 | 0.01 |
| Control I | adding titanium solution to the alkali solution. | 13 | 0.5 |
| Control II | adding alkali solution to the titanium solution. | 87 | 4.7 |

From the above table it has clearly been shown that by admixing an iron-containing titanium solution and an alkali solution to form a mixture thereof and by said solutions being added one to the other at rates sufficient to maintain said mixture during such addition at a pH range from 3.5 to 4.5 that a substantially iron free rapid filtering orthotitanic acid may be obtained. Apparently the titanium hydrate when formed at a substantially constant pH, compared with processes involving an ever changing pH, that a superior type of orthotitanic acid may be produced by the process of this invention.

While this invention has been described and illustrated by the examples shown, it is not intended to be strictly limited thereto and other modifications and variations may be employed within the scope of the following claims.

I claim:

1. A method for producing a substantially iron-free rapid filtering orthotitanic acid which comprises simultaneously transferring an iron-containing titanium solution and an alkali solution to a common container where they are admixed and reacted, the rate of transfer of each solution to said container being adjusted to maintain continuously pH range from 3.5 to 4.5 in the admixed solutions during said transfer and reaction, and filtering and washing the same.

2. Method according to claim 1 in which the iron-containing titanium solution is a sulfate solution.

FRANKLIN L. KINGSBURY.

REFERENCES CITED

The following references are of record in the file of this patent:

UNITED STATES PATENTS

| Number | Name | Date |
|---|---|---|
| 1,758,528 | Mecklenburg | May 13, 1930 |
| 2,304,110 | McKinney | Dec. 8, 1942 |

OTHER REFERENCES

Mellor's "Inorganic & Theoretical Chemistry," vol. 7, 1927 ed., pages 39, 50, Longmans, Green & Co., N. Y.

McPherson & Henderson's "General Chemistry," 3rd ed., page 601, Ginn & Co., N. Y.